United States Patent
Diab

(10) Patent No.: US 7,971,075 B2
(45) Date of Patent: *Jun. 28, 2011

(54) FOUR-PAIR MIDSPAN POWERING WITH A SPLITTER IN A POWER OVER ETHERNET APPLICATION

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/860,608

(22) Filed: Sep. 25, 2007

(65) Prior Publication Data

US 2009/0083550 A1    Mar. 26, 2009

(51) Int. Cl.
*G06F 1/26* (2006.01)
(52) U.S. Cl. .......................................... 713/300; 307/17
(58) Field of Classification Search .................. 713/300; 307/17
See application file for complete search history.

(56) References Cited

U.S. PATENT DOCUMENTS

| 7,057,899 | B2 | 6/2006 | AbuGhazaleh et al. |
| 7,474,704 | B2 | 1/2009 | Lum et al. |
| 7,778,409 | B2 | 8/2010 | Karam |
| 2005/0197094 | A1 | 9/2005 | Darshan et al. |
| 2006/0078093 | A1 | 4/2006 | Karam et al. |
| 2006/0092826 | A1* | 5/2006 | Karam et al. ............... 370/216 |
| 2007/0077819 | A1* | 4/2007 | Thomson et al. ........ 439/620.01 |

FOREIGN PATENT DOCUMENTS

WO    WO 2006/052360 A1    5/2006

OTHER PUBLICATIONS

David Law and Wael William Diab, "100BASE-T normative 350uH inductance specification and IEEE P802.3at," IEEE P802.3at DTE Power Enhancements Task Force, Jul. 16-19, 2007.

* cited by examiner

*Primary Examiner* — Albert Wang
(74) *Attorney, Agent, or Firm* — Duane S. Kobayashi

(57) ABSTRACT

A midspan power sourcing equipment (PSE) that supports four-pair powering in a power over Ethernet (PoE) applications. The midspan PSE can provide power to two separate end devices using a single cable. To ensure compatibility with legacy Ethernet devices, the ports used for transmission of data are designed with a sufficient inductance level or a low effective impedance at a frequency of operation.

20 Claims, 6 Drawing Sheets

FOUR-PAIR MIDSPAN POWERING WITH A SPLITTER IN A POWER OVER ETHERNET APPLICATION

BACKGROUND

1. Field of the Invention

The present invention relates generally to Power over Ethernet (PoE) and, more particularly, to four-pair midspan powering in a PoE application.

2. Introduction

The IEEE 802.3 af and 802.3 at PoE specifications provide a framework for delivery of power from power sourcing equipment (PSE) to a powered device (PD) over Ethernet cabling. In this framework, various PDs can be deployed such as voice over IP (VoIP) phones, wireless LAN access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a Layer 1 power classification.

In one configuration, power can be sourced directly from data terminal equipment such as an Ethernet switch. This type of network device is referred to as an endspan device. In another configuration, power can be supplied by a midspan device. FIG. 1 illustrates such a midspan configuration, which includes a medium dependent interface (MDI) link between Ethernet switch 110 and PD 130. Midspan configurations can be used for 100BASE-TX systems. As illustrated, midspan PSE 120 is placed in the middle of the MDI link for the insertion of power to be supplied to PD 130. An advantage of such a midspan configuration is the usage of legacy Ethernet switches that do not have PoE capabilities.

In one midspan configuration, data is transmitted using pins 1 (TX+), 2 (TX−), 3 (RX+), and 6 (RX−) of the Ethernet cable. The remaining pins 4, 5, 7, and 8, which are representative of the two unused pairs of the Ethernet cable, can be used by midspan PSE 120 for the transmission of power to PD 130.

In an alternative midspan configuration, power is not transmitted on the two unused pairs, but transmitted on the two signal pairs used for data transmission. In this configuration, only two wire pairs are needed for the transmission of data and power. As an Ethernet cable includes four wire pairs, there exists the possibility that a midspan PSE can facilitate the transmission of data only or data and power to two separate devices using a single four wire pair cable. This configuration can be desirable in those situations where the existing cable infrastructure is limited.

In general, midspan PSE design guidelines have not been tightly specified beyond a general recognition that the cabling channel performance should be maintained by the midspan PSE when it is inserted into an MDI link. What is needed therefore is a mechanism that ensures that a midspan PSE maintains proper compatibility with various network elements such as legacy Ethernet devices in various deployment scenarios such as the support of two separate devices using a single four wire pair cable.

SUMMARY

A system and/or method for four-pair midspan powering in a PoE application, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
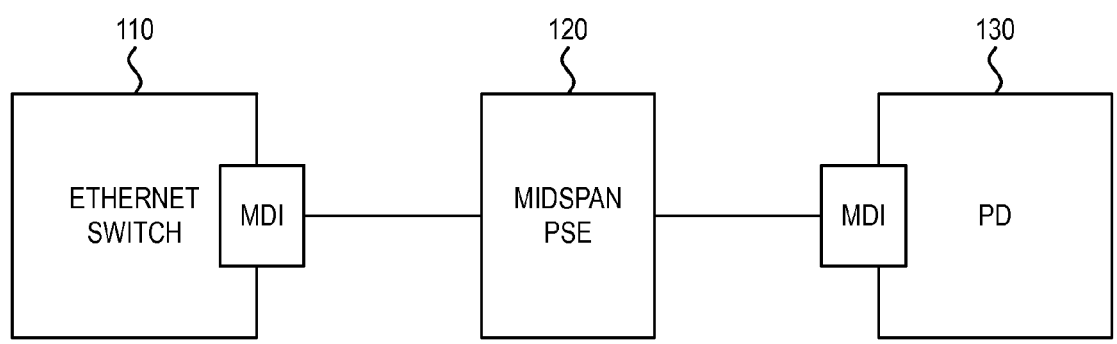
FIG. 1 illustrates an example of the inclusion of a midspan PSE in an MDI link.
Figure 2:
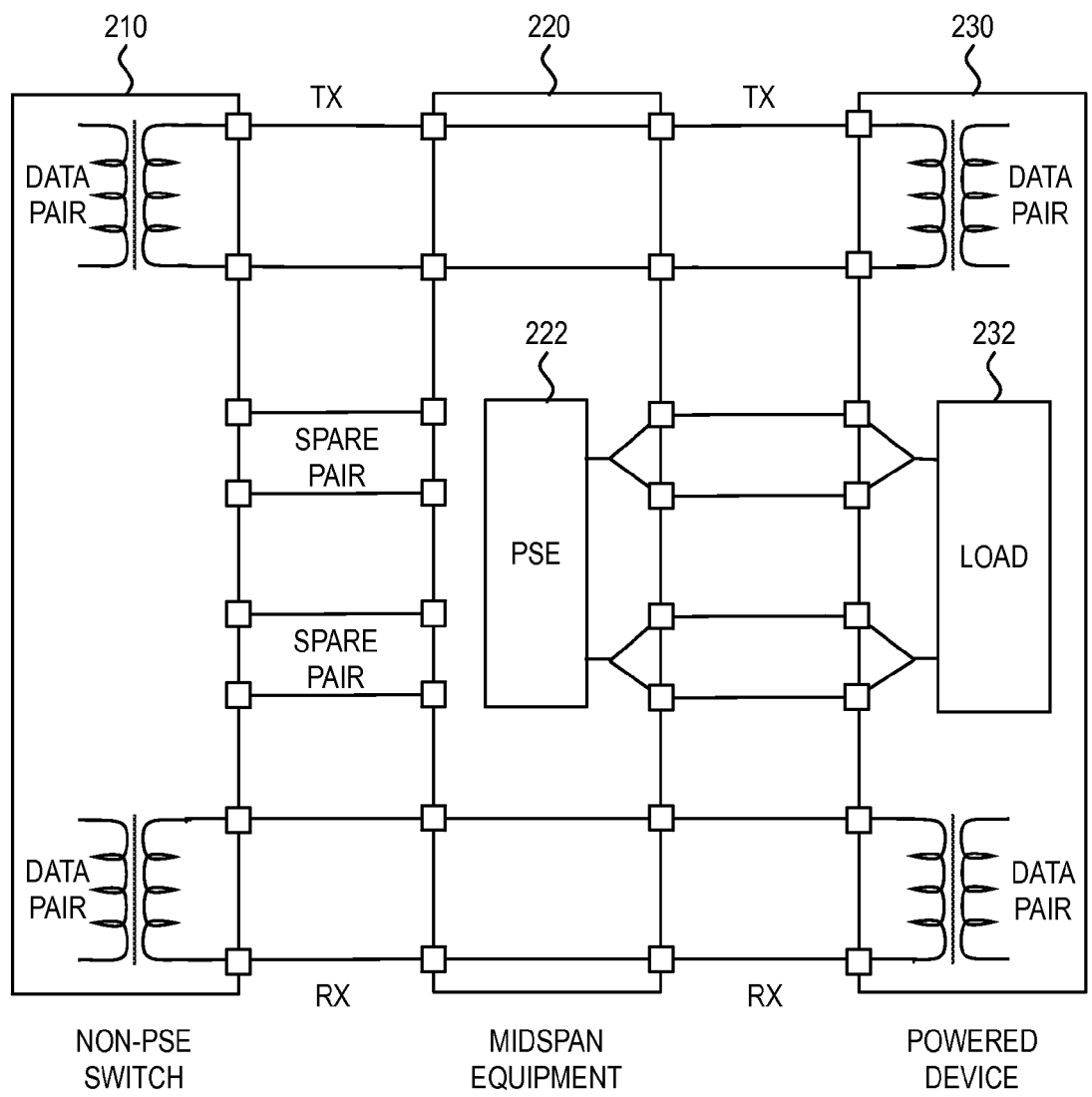
FIG. 2 illustrates an embodiment of powering a PD by midspan equipment using unused wire pairs.

As noted, one type of midspan PoE configuration can be designed to use the two unused wire pairs for the transmission of power to the PD (referred to as Alternative B). FIG. 2 illustrates an example of such a midspan configuration. As illustrated, the two unused wire pairs are terminated at midspan equipment 220. The remainder of the link of the two unused wire pairs is then used to transmit power from PSE 222 to PD 230. As power is inserted onto the link by midspan equipment 220, Ethernet switch 210 need not have PoE capabilities. Ethernet switch 210 can therefore represent legacy Ethernet equipment. In general, a PD is capable of receiving power from either wire pair in 802.3 af and two-pair powering in 802.3 at.

At midspan equipment 220, power is inserted using PSE 222. Specifically, PSE 222 provides power to PD 230 using the two unused wire pairs, which are terminated at midspan equipment 220. The power carried on the two unused wire pairs is then extracted at PD 230 to power load 232.

As further illustrated in FIG. 2, the two signal wire pairs used for data transmission are passed through midspan equipment 220 onto PD 230. This pass-through connection can be implemented as an undisrupted channel connection between Ethernet switch 210 and PD 230. In other words, the characteristics of the wired channel connection between Ethernet switch 210 and PD 230 can be left largely undisturbed as the data transmissions pass through midspan equipment 220.

Figure 3:
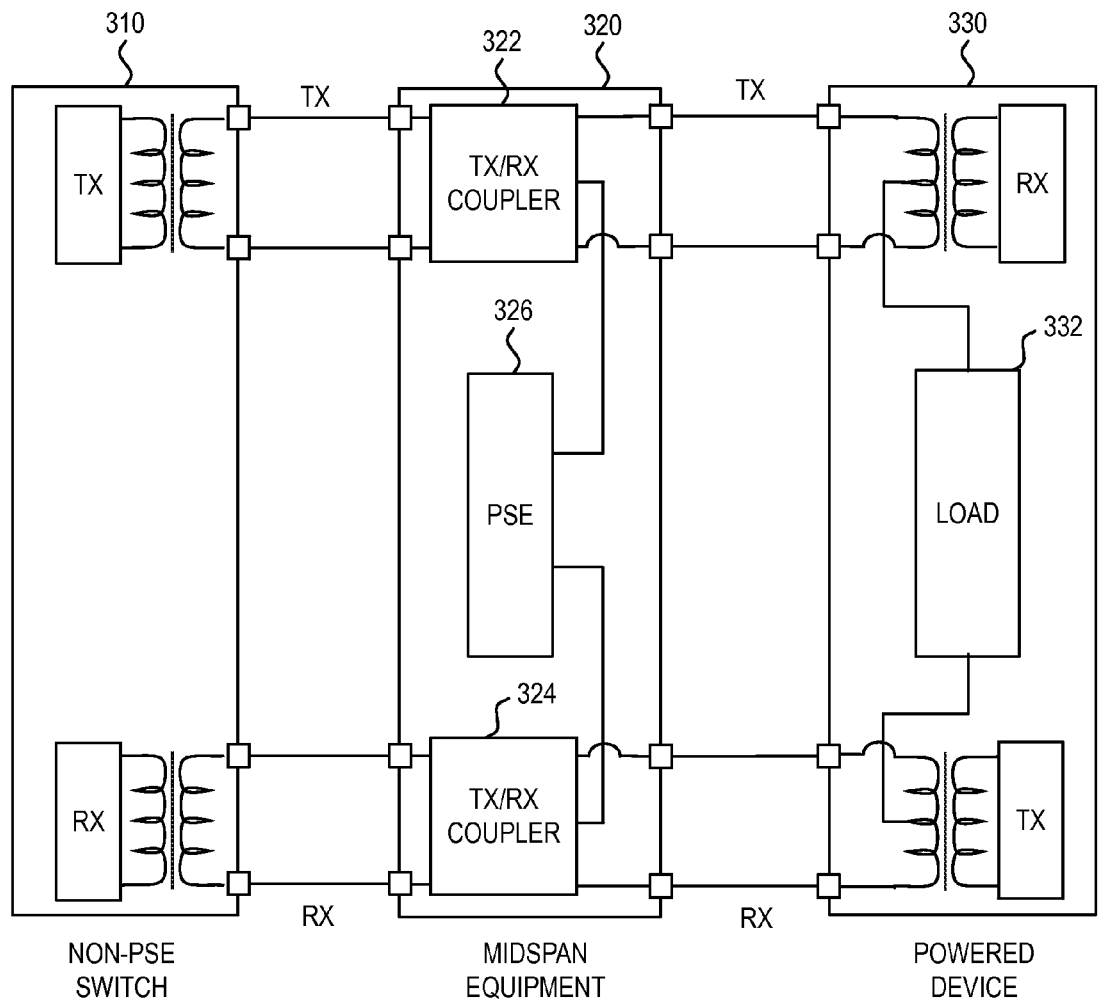
FIG. 3 illustrates an embodiment of powering a PD by midspan equipment using the data transmission signal wire pairs.

FIG. 3 illustrates an alternative midspan powering configuration that uses the two data transmission signal wire pairs for powering, instead of the two unused wire pairs. In this alternative midspan powering scheme, the channel connection between Ethernet switch 310 and PD 330 is disturbed to accommodate the insertion of power by PSE 326.

Consider, for example, the TX signal wire pair. In this signal wire pair, data is transmitted from Ethernet switch 310 and received at midspan equipment 320. After passing through transmit/receive (TX/RX) coupler 322, the data is then transmitted to PD 330. Similarly, for the RX signal wire pair, data that is transmitted by PD 330 is received at midspan equipment 320. After passing through TX/RX coupler 324, the data is then transmitted on to Ethernet switch 310. In one conventional midspan equipment example, the TX/RX couplers are embodied using a magnetic element such as a transformer.

The disruption in the channel connection between Ethernet switch 310 and PD 330 allows for the application of DC power on a side of the TX/RX coupler that is isolated from the other side. The transmitted power can then be extracted at PD 330 through the taps of the corresponding transformers in PD 330. The extracted power is then used to drive load 332.

Figure 4:
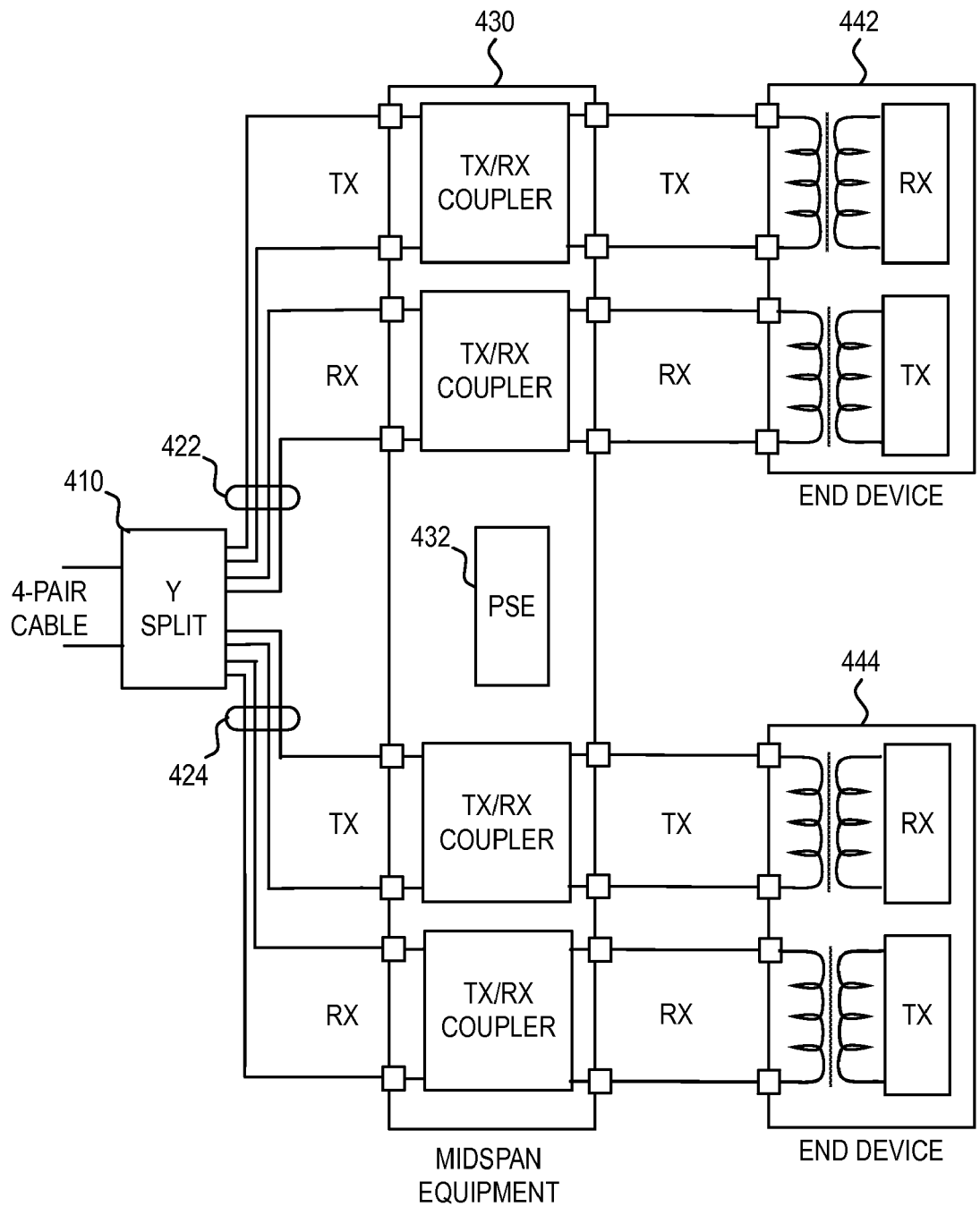
FIG. 4 illustrates an embodiment of powering multiple end devices using wire pairs from a single cable.

As data and power can be transmitted using two wire pairs, it is possible for a single Ethernet cable to support two separate end devices. FIG. 4 illustrates an example of such a configuration. As illustrated, a single four-pair Ethernet cable can be coupled to Y connector 410. In this example, Y connector 440 can be designed to split a four-pair cable into two two-pair groupings 422, 424. A corresponding Y connector can also be included at the other end of the 4-pair cable for connection to the switch.

The two wire pairs in two-pair groupings 422, 424 are provided to midspan equipment 430. The two wire pairs in grouping 422 are used to support end device 442, while the two wire pairs in grouping 424 are used to support end device 444.

In one scenario, end devices 442, 444 receive data and power over two wire pairs. In this scenario PSE 432 in midspan equipment 430 would insert power (connections not shown) into the two wire pairs through a pair of TX/RX couplers. In another scenario, one of the end devices receives data and power over two wire pairs, while the other end device receives data only. In yet another scenario, both end devices 432, 434 can be configured to receive data only. Where an end device receives data only, a TX/RX coupler need not be required. Rather, a simple pass-through connection would suffice resulting in an undisrupted channel connection.

In one embodiment, midspan equipment 430 is designed to support the insertion of power on either or both of two-wire groupings 452, 454. TX/RX couplers would therefore be used in each of the two midspan equipment ports. In this embodiment, midspan equipment 430 can be designed to support the insertion of power on either midspan port, thereby enabling flexibility in port configuration for the various connected end devices.

One of the consequences of having TX/RX couplers in the midspan equipment is a disrupted channel connection between the Ethernet switch and the end device (i.e., PD or non-PD). In a conventional non-disrupted channel connection where a pass-through connection exists at the midspan equipment, only a single transformer pair is used at the two ends of the link (i.e., at the Ethernet switch and the end device). When a disruption occurs at the midspan equipment, two separate segments in the link are created.

FIG. 3 illustrates the two segments in a disrupted connection. On the transmit side, a first segment is represented by the transmission transformer in switch 310 and a first side of TX/RX coupler 322, and a second segment is represented by the second side of TX/RX coupler 322 and the receiving transformer in PD 330.

In the present invention, it is recognized that the conventional inclusion of a transformer as TX/RX couplers in midspan equipment 320 can lead to mismatches between a transmitter and receiver. For example, consider the inductance requirement that is specified by the 100BASE-TX specification for the transmit side. As the 100BASE-TX specification sets forth, the minimum inductance measured at the transmit pins shall be greater than or equal to 350 µH with any DC bias current between 0-8 mA injected. As would be appreciated, other inductance ranges (higher or lower) can also be specified for a given application. For example, a higher inductance range can be specified to accommodate higher DC bias currents that would be expected in a high power PoE application such as 802.3 at. In general, the specification of a minimal inductance in a transformer on the transmit side is designed to ensure compatibility with PHY receivers (e.g., 100BASE-TX) that expect to see the effective inductance on the channel such that the signal quality and BER of the link is not impacted.

In an undisrupted channel connection between an Ethernet switch and a PD, this requirement can be met by the inclusion of a transmitter transformer at the Ethernet switch that presents at least a certain level of inductance (e.g., 350 µH) at the transmit pins. This minimum inductance level can be specified to present sufficient inductance that would overcome killer patterns that cause baseline wander so that the receiver can recover. In other words, the inductor at the source slows down the edges.

For channel connections that are disrupted at the midspan equipment, however, this switch transmitter transformer inductance characteristic would not apply to the far end. Rather, the performance experienced by the receiver in the far end PD would be dictated by the characteristics of the side of the TX/RX coupler in the midspan equipment that was facing the PD. If the PD side of the TX/RX coupler is not properly designed, then the bit error rate (BER) can increase to unacceptable levels due to baseline wander. This issue is especially problematic when dealing with legacy equipment that does not have compensated physical layer devices (PHYs) at the receiving end.

It is therefore a feature of the present invention that the midspan equipment is designed to ensure compatibility with all legacy equipment whether or not power is inserted by the midspan equipment onto the two data transmission signal wire pairs. In one embodiment, this compatibility is enabled through the insertion of inductance at the transmission TX/RX coupler of the midspan to overcome killer patterns that can cause baseline wander, thereby enabling the receiver to recover. As would be appreciated, this effect would be felt regardless of the level of inductance at the switch. In other words, for designs that do not have inductance in the PHY, the insertion of the inductance at the midspan can alleviate the issue.

In another embodiment, this compatibility is enabled through the inclusion of a TX/RX coupler having a low effective impedance at a frequency range of interest (e.g., operation frequency for 100BASE-TX). By including such a TX/RX coupler design at the midspan equipment, powering on the signal wire pairs would present a sufficiently low impedance at the frequency range of operation, thereby preventing issues such as baseline wander. Again, this effect would be felt regardless of the level of inductance in the transformer at the switch.

Figure 5:
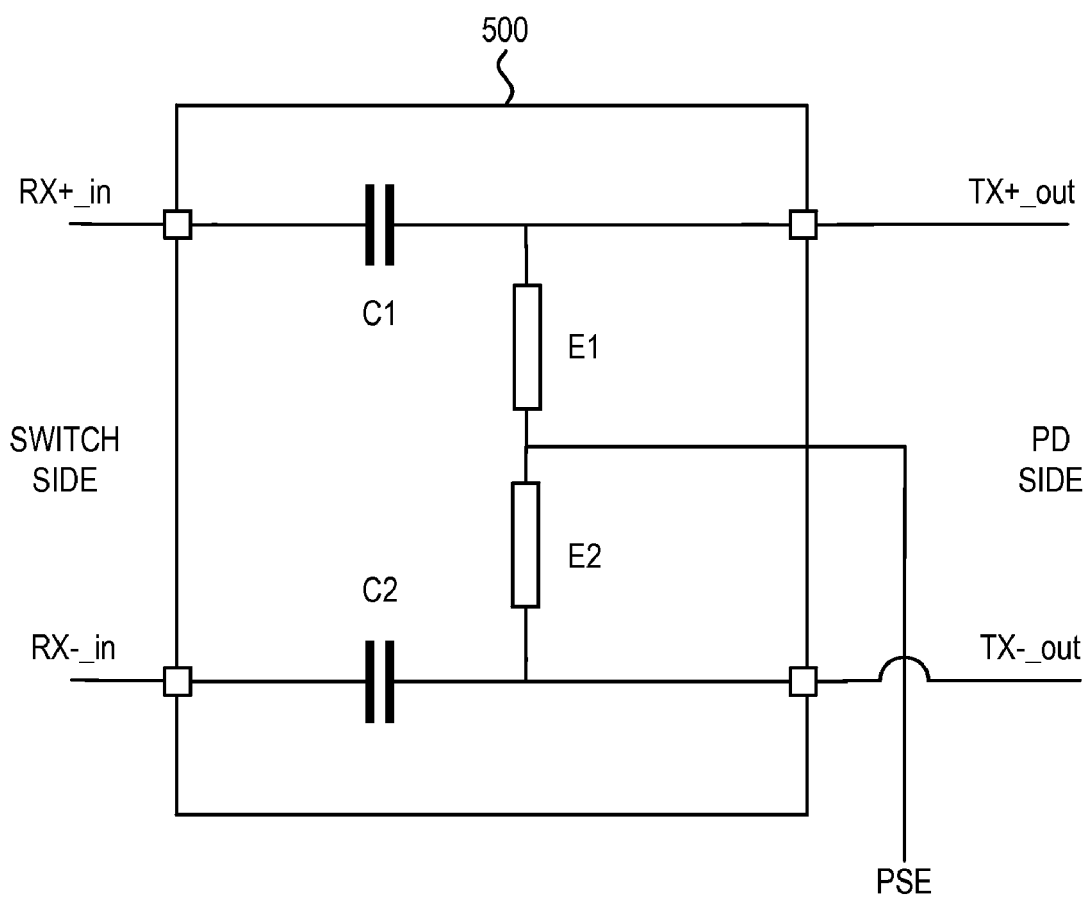
FIG. 5 illustrates an embodiment of a transmitter/receiver coupler according to the present invention.

FIG. 5 illustrates a simple example embodiment of a TX/RX coupler having a low effective impedance at a frequency range of interest. As illustrated, TX/RX coupler 500 includes blocking capacitors C1, C2 that enables DC isolation between the two sides of TX/RX coupler 500. On the PD side of TX/RX coupler 500, elements E1, E2 are designed to create a low impedance effect at the frequency range of interest. As would be appreciated, the particular inclusion of resistive, capacitive, and/or inductive components in elements E1, E2 would be implementation dependent. Here, it is significant that the PD side of TX/RX coupler 500 would appear as the far end of the link to a legacy receiving PHY at the PD. In general, the midspan equipment design on the transmit side is critical for ensuring proper compatibility with legacy equipment.

The midspan equipment design of the present invention enables the support of legacy PHYs on either end of the link. The legacy PHY can be included in either the switch or the PD. As such, the inclusion of a midspan TX/RX coupler having sufficient inductance or a low effective impedance at a frequency of operation enables the support of legacy Ethernet switches and PDs.

Figure 6:
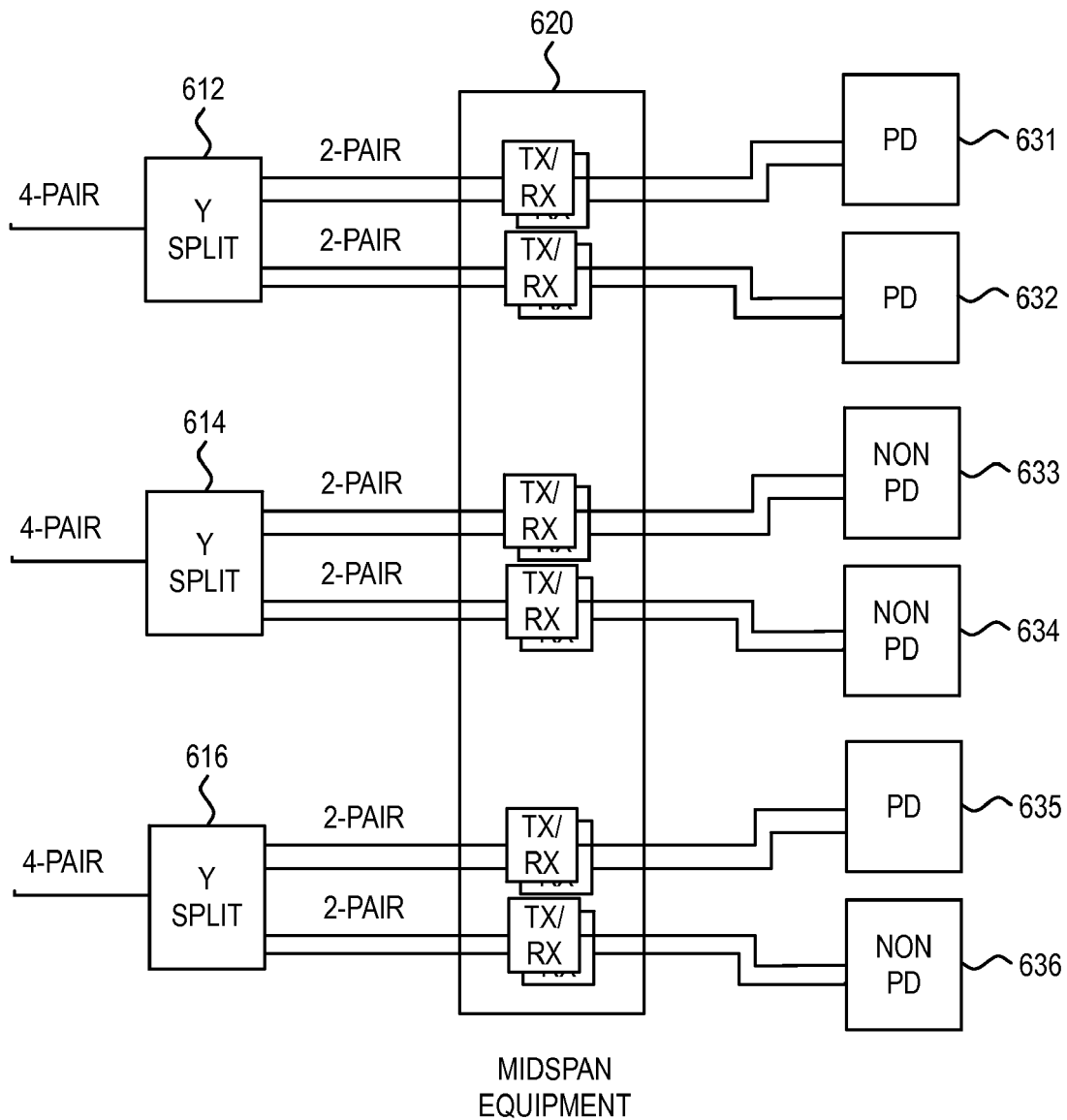
FIG. 6 illustrates an example of the support of various end devices by midspan equipment.

In accordance with the present invention, legacy switches and end devices are supported by midspans that enable four-pair powering. As illustrated in FIG. 6, Y splitters 612, 614, 616 provide two two-pair wire groupings to midspan equipment 620. In other words, a single cable can be coupled to two ports. The two two-pair wire groupings can support two PDs 631, 632, two non-PDs 633, 634, or one PD 635 and one non-PD 636.

Regardless of whether power was applied to a given two-pair wire grouping, legacy switches or end devices would be supported through the inclusion of a sufficient inductance level or a low effective impedance and a frequency of operation into the TX/RX couplers.

In the above description, two wire pair groupings were generated by a Y splitter. As would be appreciated, the principles of the present invention can be applied to any coupling device that is designed to generate distinct wire pair groupings from one or more input cables.

In one embodiment, the principles of the present invention can also be applied to four-pair PoE powering schemes such as 802.3 at. In these four-pair PoE powering schemes, all four pairs of the Ethernet cable are used to carry power to the PD. As such, any wire pair that is used for both data transmission and power would benefit from the principles of the present invention.

Finally, the principles of the present invention can also be applied to medium dependent interface crossover (MDIX) ports.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A midspan power sourcing equipment, comprising:
   a first pair of transmit/receive couplers, a switch side of said first pair of transmit/receive couplers being coupled to respective wire pairs in a first two wire pair grouping;
   a second pair of transmit/receive couplers, a switch side of said second pair of transmit/receive couplers being coupled to respective wire pairs in a second two wire pair grouping, wherein said first two wire pair grouping and said second two wire pair grouping are output by a splitter that splits a four wire pair Ethernet cable; and
   a power source that inserts power onto a device side of at least one of said first and said second pair of transmit/receive couplers, wherein said at least one of said first and said second pair of transmit/receive couplers is configured to present a low effective impedance at a frequency of operation.

2. The midspan power sourcing equipment of claim 1, wherein said transmit/receive couplers include blocking capacitors.

3. The midspan power sourcing equipment of claim 1, wherein said low effective impedance is sufficient to ensure compatibility with a physical layer device at a receiving device that does not compensate for baseline wander.

4. The midspan power sourcing equipment of claim 3, wherein said physical layer device is at a switch.

5. The midspan power sourcing equipment of claim 3, wherein said physical layer device is at an end device.

6. The midspan power sourcing equipment of claim 1, wherein said power source conforms to the 802.3 af specification.

7. The midspan power sourcing equipment of claim 1, wherein said first and said second pair of transmit/receive couplers are configured to present a low effective impedance at a frequency of operation.

8. A midspan power sourcing equipment, comprising:
   a first pair of transformers, a switch side of said first pair of transformers being coupled to respective wire pairs in a first two wire pair grouping;
   a second pair of transformers, a switch side of said second pair of transformers being coupled to respective wire pairs in a second two wire pair grouping, wherein said first two wire pair grouping and said second two wire pair grouping are output by a splitter that splits a four wire pair Ethernet cable; and
   a power source that inserts power onto a device side of at least one of said first and said second pair of transformers, wherein said at least one of said first and said second pair of transformers is configured to present an increased level of inductance that can operate with a receiving physical layer device that does not compensate for baseline wander.

9. The midspan power sourcing equipment of claim 8, wherein data transmission on said at least one of said first and said second pair of transformers is 100BASE-TX.

10. The midspan power sourcing equipment of claim 8, wherein said increased level of inductance is 350 µH.

11. The midspan power sourcing equipment of claim 8, wherein said increased level of inductance meets the 100BASE-TX specification.

12. The midspan power sourcing equipment of claim 8, wherein said increased level of inductance is sufficient to ensure compatibility with a physical layer device at a receiving device that does not compensate for baseline wander.

13. The midspan power sourcing equipment of claim 8, wherein said first and said second pair of transformers are configured to present an increased level of inductance.

14. The midspan power sourcing equipment of claim 8, wherein said power source conforms to the 802.3 af specification.

15. The midspan power sourcing equipment of claim 8, wherein said receiving physical layer device is at a switch.

16. The midspan power sourcing equipment of claim 8, wherein said receiving physical layer device is at an end device.

17. A power over Ethernet system, comprising:
   a splitting device that generates a plurality of two wire pair groupings from one or more four wire pair cables; and a midspan power sourcing equipment that receives said plurality of two wire pair groupings at respective pairs of transmit/receive couplers, wherein said pairs of transmit/receive couplers are designed to support a receiving physical layer device that does not compensate for baseline wander.

18. The power over Ethernet system of claim 17, wherein said splitting device splits one four wire pair cable into two two wire pair groupings.

19. The power over Ethernet system of claim 17, wherein said pairs of transmit/receive couplers are designed to present an increased level of inductance that can operate with a receiving physical layer device that does not compensate for baseline wander.

20. The power over Ethernet system of claim 17, wherein said pairs of transmit/receive couplers are designed to present a low effective impedance at a frequency of operation.

* * * * *